No. 737,059. Patented August 25, 1903.

UNITED STATES PATENT OFFICE.

ARON M. BEAM, OF DENVER, COLORADO, ASSIGNOR TO THE BEAM CONVERTING FURNACE COMPANY, A CORPORATION OF COLORADO.

ART OF TREATING REBELLIOUS OR REFRACTORY ORES.

SPECIFICATION forming part of Letters Patent No. 737,059, dated August 25, 1903.

Application filed May 12, 1899. Serial No. 716,597. (No model.)

*To all whom it may concern:*

Be it known that I, ARON M. BEAM, a citizen of the United States, residing in Denver, in the county of Arapahoe and State of Colorado, have invented a new and useful Improvement in the Art of Treating Rebellious or Refractory Ores for Recovery of Precious Metals, of which the following is a specification.

My invention relates to the art of treating refractory or rebellious ores for recovery of precious metals—that is to say, ores in which the gold and other precious metals are not found in a free state or what is commonly known as a "free-milling" condition, such ores being generally termed "sulfid," "tellurid," or "arsenid" ores from the fact that they contain sulfur, tellurium, arsenic, and other substances or compounds thereof in a crystalline form or non-soluble condition, which renders it impossible to separate the gold or precious metals in the ores by amalgamation even though the ore be finely ground or pulverized. The gold and other precious metals in such ores have heretofore been imperfectly or partially extracted and recovered by tedious and costly processes, involving a great amount of time and labor and great expense for fuel and costly chemicals, the processes heretofore most commonly in use involving a costly desulfurizing roasting operation, in which the ore is subjected for many hours—from six to sixty hours—to a high heat, ordinarily from 1,000° to 2,400° Fahrenheit, in connection with a costly chemical treatment by chlorination or cyaniding. In the old processes the roasting operation, which is continued for many hours at a high heat and generally in a reverberatory, calcining, or other furnace, in which the flame or products of combustion of the fuel are carried over the ore, is for the purpose of burning and driving off the sulfur, arsenic, antimony, and other refractory elements, and it frequently causes a loss of a material percentage of the gold or precious metals in the ore, the same being carried off in the products of combustion or vapors generated either in the form of vapor or of exceedingly small particles, and even after such slow, costly, and laborious treatment only from eighty to ninety per cent. of the gold and other precious metals in the ores after roasting are recovered, and the tailings require then to be concentrated and the concentrates smelted, the concentrating and smelting, however, only recovering a percentage of the precious metals left in the tailings. In the old processes also the zinc, lead, and copper in the ore cannot be recovered, and many ores containing precious metals frequently have a material value in lead, zinc, or copper, or one or more of these, and where an ore contains even as high as one per cent. of copper the cyanid process, which is the cheaper of the processes heretofore commonly in use, is not and cannot be practically used. The processes previously used for treating rebellious or refractory ores, therefore, have not heretofore been practicable upon anything except high-grade or medium-grade ores, as the cost of the treatment itself exceeds the value of what are commonly termed "low-grade" ores or those not running above ten dollars or twelve dollars per ton.

The object of my invention is to provide a simple, cheap, and efficient process for treating refractory or rebellious ores by means of which the gold and other precious metals contained therein may be substantially all recovered without loss, and by which high-grade, medium-grade, and low-grade ores may all be successfully treated, and by means of which also the zinc, lead, and copper values of the ore may also be saved. I have discovered that this important object or result may be practically accomplished by an exceedingly simple and inexpensive process or method, consisting in the following steps: first, pulverizing the ore to from forty to eighty mesh; second, subjecting, it in connection with a suitable flux or reagent added thereto, for a period of from fifteen minutes to one hour, according to the character and composition of the ore, to the action of a low degree of indirect heat while the air is excluded, the heating being done in a closed oven or muffle at a temperature of from 250° to 500° Fahrenheit, which operates to begin to change or partially change the sulfids of the base metals into soluble sulfates without burning the sulfur or causing any cementation or coating of the ore particles with residuum of sulfur; third, I next after the conversion of the sulfids of the base metals into sulfates is well under way or so far advanced that now the admission of air or oxygen will not cause burning of the sulfur or cementation or coating of the ore particles with residuum of sulfur, which would prevent amalgamation and defeat my process, admit fresh air, preferably in a heated condition, to the ore in the closed oven or muffle for a period of from fifteen minutes to one hour, which supplies the necessary oxygen to complete the conversion of the sulfids of the base metals into soluble sulfates and to leave the gold in a free condition capable of ready amalgamation in the ordinary way and the silver either in a free condition or in the form of a low sulfid, so that it may be easily saved by amalgamation or concentration; fourth, the converted ore being then removed from the furnace and cooled and the necessary amount of water being added is then subjected to an amalgamating action or treatment and from eighty to ninety per cent. of the gold and a greater or less per cent. of the silver separated and recovered, the ore during this step being preferably kept from contact with metallic iron, the presence of which would, I believe, set up a galvanic action that would tend to interfere with or prevent amalgamation of the gold by causing the gold particles or some of them to pass over the amalgamating-plates without adhering thereto, (though I would not undertake to explain the scientific effect or reason why the presence of iron is objectionable;) fifth, the ore and water after passing over the amalgamating-plates are next passed to concentrating-tables and the remaining gold and silver and also the lead if the ore has contained lead in sufficient quantities to make it desirable to save it and which after the conversion is now chiefly in the form of an oxid, is collected as a concentrate; sixth, I next if the ore has contained copper or zinc in sufficient quantities to make it desirable to save them recover the same by separating the soluble copper and zinc sulfates from the insoluble portions of the ore, the copper and zinc after conversion in the closed oven or muffle being in the form of soluble sulfates and forming a solution with the water used in the amalgamating and concentrating steps, and then, or seventhly, collecting the copper and zinc by precipitation, and, eighth or finally, the concentrate, if it contains not enough lead to make it worth saving, is reground and put a second time through the same operations, being preferably added to the fresh ore to be treated, as otherwise sulfur would be required to be added to it, or, if the ore contains a sufficient amount of lead to make it desirable to save it, it is then smelted to recover the remaining gold, silver, and lead. The ore after being pulverized and before being placed in the closed oven or muffle for the heating step is preferably subjected to a drying or preliminary heating step of about 212° Fahrenheit until the ore is brought up to a temperature of 200° or 212° Fahrenheit. The flux or reagent is preferably added to and mixed with the ore at this time and before the ore is passed into the closed oven or muffle. The character and composition of the flux or reagent will vary with the particular character and composition of the ore being treated. It is ordinarily composed of carbon, fused common salt, (anhydrous sodium chlorid,) nitrate of soda, and silica, the proportions of the ingredients varying with the ore. By "fused common salt" I mean common salt from which the water of crystallization has been driven off by heat. I use fused common salt as contradistinguished from common salt to prevent the formation of chlorin gas or other injurious action. If the ore contains a sufficient quantity of zinc to make it desirable to save it, I substitute carbonate of potash as the oxidizing salt instead of and as an equivalent for the nitrate of soda, and if the copper in the ore is desired to be saved I substitute carbonate of ammonia as the oxidizing salt instead of and as an equivalent for the nitrate of soda, as the nitrate of soda would prevent the zinc and copper from forming soluble sulfates. If the ore is deficient in sulfur, sulfur is added to the flux or reagent. The several substances comprising the flux or reagent are mixed together and preferably pulverized to the same degree of fineness as the ore before mixing the same with the ore. The quantity of flux or reagent to be added to and mixed with the ore varies with the particular character and composition of the ore. Ordinarily it is from one to five pounds per ton, outside of the carbon, which is generally from three to twelve pounds per ton. The proportions of the ingredients in the flux or reagent will vary greatly with the character and composition of the ore. The proportions, however, for an ordinary ten per cent. sulfid ore would be approximately sixty-eight per cent. carbon, twenty-two per cent. fused common salt, (anhydrous sodium chlorid,) eight per cent. nitrate of soda or its equivalent, and two per cent. silica. In preparing the flux or reagent the salt and silica are fused together with what carbon they will take up to saturation. Then the mixture of common salt (anhydrous sodium chlorid) and silica is pulverized and mixed with the pulverized nitrate of soda and the balance of the carbon. The pulverized flux or reagent is then ready to be mixed with the ore. After the conversion of the ore is completed and the gold and precious metals reduced to a free milling or amalgamating condition it will be found that in many cases the ore has very nearly doubled in volume owing to the spongy porous flocculent condition into which it has been changed by the conversion steps of my process. It will also be found that the ore in many cases after conversion is of substantially the same weight as before, this being in part due to the fact that the sulfur instead of being burned out or expelled, as in the old desulfurizing processes, is largely simply converted from a sulfid to a sulfate form, the sulfur ingredients in the ore being utilized in the chemical change or conversion that takes place in the ore. The fact that the ore remains substantially the same weight after conversion as before is also, I believe, in part due to the absorption of oxygen during the period when the air is admitted to the ore, the weight lost by the escape of the fugitive gases—such as tellurium, sulfur, antimony, or arsenic—being largely replaced by oxygen absorbed from the air admitted.

During the first heating step of my process while the ore is being subjected to a low degree of heat in a closed oven or muffle to which admission of air is excluded the oxygen necessary for beginning to change or partially change the sulfids of the base metals into sulfates is or may be in part supplied from the ore itself, if it happens to be of a character containing an excess of oxygen, or from the flux or reagent added to the ore to start the conversion, or from the air mingled with the pulverized ore, or from the air contained in the closed oven above the ore, or from any oxygen compounds in the ore which are disassociated by the action of the heat and flux. In some cases also it may be found that by mixing two or more ores of different characters together the one may act as the flux or reagent for the other.

In the practical operation of my process in order to determine with certainty when the conversion of the sulfids of the base metals into sulfates has been sufficiently well advanced to make it safe to admit air to the ore or muffle without danger of causing combustion of the sulfur and cementation or coating of the ore particles with residuum of sulfur I test the ore being heated in the closed muffle from time to time. This may be done by inserting through an eye-hole in the furnace a red-hot iron rod into the ore. If the ore clings to the hot iron rod, the step of heating in the closed muffle while the air is excluded has not been continued long enough. If, on the other hand, the ore will not stick to the hot iron, it is ready for the next step or the admission of fresh air in a heated condition to the ore to complete the conversion. Another test which may be used for this purpose is to admit a small quantity of air to the ore through the eye-hole. If the small particles of ore that come in contact with the air thus admitted are seen to form slight explosions over the bed of the ore, the heating step in the closed muffle has not been continued long enough and must be carried further. If, on the other hand, the admission of the air causes no such explosions or little volcanoes over the bed of the ore, the second step of the process is completed and the air may be admitted. During the first heating step admission of air to the closed oven or muffle containing the ore is excluded, by which I mean that the closed oven or muffle is kept as near tight as practicable against the admission of air and that during this step the valves, peep-holes, doors, or other openings through which air might freely enter or be admitted to the muffle are kept closed.

In treating by my process ores which contain no copper or zinc, or so little as to make it undesirable to save the same, the sixth and seventh or leaching and precipitation steps of the process are omitted.

In treating by my process ores which contain no lead, or so little as to make it undesirable to save it, I prefer instead of smelting the concentrates to recover the remaining gold and silver left in the ore after the amalgamation step to subject the concentrates a second time to the process, as I find that by so doing substantially all the gold and precious metals in the concentrates may be thus recovered, and is thus cheaper and better than smelting. In thus treating the concentrates to recover the remaining gold and silver they are preferably reground, mixed with the necessary flux or reagent, to which sulfur is to be added if the concentrates are treated alone or without an admixture of fresh ore, and they are then subjected first to the action of heat in a closed oven or muffle, and then to the action of heat and air admitted to the muffle, and then to the amalgamating step, as before described, when substantially all the gold and precious metals will be recovered.

Before treating any particular ore by my process the particular composition and proportion of ingredients of the flux or reagent to be added thereto to produce the best results are first accurately determined by analysis and by tests with small quantities of the ore.

The "fused common salt" used in my process may be chemically defined as "anhydrous sodium chlorid."

I hereby expressly disclaim as not of my invention the process of desulfurizing ores preparatory to smelting which is shown and described in the United States patent to Cherry, No. 290,213; also, the process described in the United States patent to Parnell, No. 360,904, and also the process described in the British Letters Patent to Montgomerie, No. 9,964 of 1897.

I claim—

1. The process of treating refractory or rebellious ores for recovery of precious metals, consisting in first pulverizing the ore; second, subjecting it, in connection with a suitable oxidizing flux or reagent mixed therewith, in a closed oven or muffle, to the action of a low degree of indirect heat while the air is excluded for a short time, until the sulfids of the base metals are partially converted into sulfates, so that air may be afterward admitted without burning the sulfur or causing cementation or coating of the ore particles with sulfur or other residuum; third, admitting air to the ore in the muffle and completing the conversion of the sulfids of the base metals into sulfates and the releasing of the gold or precious metals to a free or amalgamating condition by subjecting the ore for a further short time to a low degree of indirect heat, substantially as specified.

2. The process of treating refractory or rebellious ores for recovery of precious metals, consisting in first pulverizing the ore; second, subjecting it, in connection with a suitable oxidizing flux or reagent mixed therewith, in a closed oven or muffle to the action of a low degree of indirect heat while the air is excluded for a short time, until the sulfids of the base metals are partially converted into sulfates, so that air may be afterward admitted without burning the sulfur or causing cementation or coating of the ore particles with sulfur or other residuum; third, admitting air to the ore in the muffle and completing the conversion of the sulfids of the base metals into sulfates and the releasing of the gold or precious metals to a free or amalgamating condition by subjecting the ore for a further short time to a low degree of indirect heat, then separating the gold and precious metals from the ore by amalgamation, substantially as specified.

3. The process of treating refractory or rebellious ores for recovery of precious metals, consisting in first pulverizing the ore; second subjecting it, in connection with a suitable oxidizing flux or reagent mixed therewith, in a closed oven or muffle to the action of a low degree of indirect heat while the air is excluded for a short time, until the sulfids of the base metals are partially converted into sulfates, so that air may be afterward admitted without burning the sulfur or causing cementation or coating of the ore particles with sulfur or other residuum; third admitting air to the ore in the muffle and completing the conversion of the sulfids of the base metals into sulfates and the releasing of the gold or precious metals to a free or amalgamating condition by subjecting the ore for a further short time to a low degree of indirect heat, then separating the gold and precious metals from the ore by amalgamation, and then collecting the remaining gold and precious metals by concentration, substantially as specified.

4. The process of transforming refractory or rebellious ores, consisting in first pulverizing the ore; second subjecting it in connection with a flux or reagent composed of carbon, anhydrous sodium chlorid, an oxidizing salt and silica, mixed therewith, in a closed oven or muffle to the action of a low degree of indirect heat while admission of air thereto is excluded for a short time until the sulfids of the base metals are partially converted into sulfates so that air may be afterward admitted without burning the sulfur or causing cementation or coating of the ore particles with sulfur or other residuum; third admitting fresh air to the ore in the muffle and completing the conversion of the sulfids of the base metals into sulfates and the releasing of the gold or precious metals to a free milling or amalgamating condition by subjecting the ore for a further short time to a low degree of heat, substantially as specified.

5. The process of transforming refractory or rebellious ores, consisting in first pulverizing the ore; second subjecting it in connection with a flux or reagent composed of carbon, anhydrous sodium chlorid, nitrate of soda and silica mixed therewith in a closed oven or muffle to the action of a low degree of indirect heat while admission of the air thereto is excluded for a short time until the sulfids of the base metals are partially converted into sulfates so that air may be afterward admitted without burning the sulfur or causing cementation or coating of the ore particles with sulfur or other residuum; third admitting fresh air in a heated condition to the ore in the muffle and completing the conversion of the sulfids of the base metals into sulfates and the releasing of the gold or precious metals to a free milling or amalgamating condition by subjecting the ore for a further short time to a low degree of heat, substantially as specified.

6. The process of transforming refractory or rebellious ores, consisting in converting the sulfids of the base metals in the ore to sulfates, by subjecting the ore first to the action of a low degree of indirect heat in a closed oven or muffle in connection with an oxidizing flux or reagent composed of carbon, anhydrous sodium chlorid, nitrate of soda and silica while admission of fresh quantities of air to the ore is excluded, until the conversion of the sulfids to sulfates is begun, and then subjecting the ore to the action of a low degree of indirect heat while fresh air is admitted thereto without burning the sulfur, whereby the conversion is completed and a free milling condition is produced, substantially as specified.

7. The process of recovering precious metals from refractory or rebellious ores, consisting in first pulverizing the ore; second subjecting it in connection with an oxidizing flux or reagent mixed therewith in a closed oven or muffle to the action of a low degree of indirect heat while admission of air thereto is excluded for a short time until the sulfids of the base metals are partially converted into sulfates so that air may be afterward admitted without burning the sulfur or causing cementation or coating of the ore particles with sulfur or other residuum; third admitting fresh air to the ore in the muffle and completing the conversion of the sulfids of the base metals into sulfates and the releasing of the gold or precious metals to a free milling or amalgamating condition by subjecting the ore for a further short period to a low degree of heat without burning the sulfur; fourth mixing water with the ore and separating gold therefrom by amalgamation; fifth collecting the remaining gold and precious metals from the ore by concentration; and finally subjecting the concentrates a second time to said conversion and amalgamating steps, substantially as specified.

8. The process of treating refractory or rebellious ores for recovery of precious metals, consisting in first pulverizing the ore from forty to eighty mesh; second subjecting it in connection with a suitable oxidizing flux or reagent mixed therewith for a period of from fifteen minutes to one hour in a closed oven or muffle to the action of a low degree of heat from 250° to 500° Fahrenheit while the air is excluded, which serves to begin to change or partially change or convert the sulfids of the base metals into soluble sulfates without burning the sulfur or causing cementation or coating of the ore particles with residuum of sulfur or other substances; third admitting fresh air in a heated condition to the closed oven or muffle and subjecting the ore to the action of a low heat in the presence of air for a period of from fifteen minutes to one hour to complete the conversion of the sulfids of the base metals into soluble sulfates without causing cementation or coating of the ore particles with residuum of sulfur, and to leave the gold and precious metals in a free and amalgamating condition; fourth mixing the ore with water and separating the gold and precious metals therefrom by amalgamation; fifth collecting the remaining gold and precious metals and lead, if any, from the ore by concentration; and next or finally recovering the precious metals from the concentrates, substantially as specified.

ARON M. BEAM.

Witnesses:
   EDMUND ADCOCK,
   H. M. MUNDAY.